US005279322A

United States Patent [19]

Nakamura et al.

[11] Patent Number: 5,279,322

[45] Date of Patent: Jan. 18, 1994

[54] EXHAUST VALVE

[75] Inventors: Sanae Nakamura; Shizuo Mori, both of Ibaraki, Japan

[73] Assignee: SMC Kabushiki Kaisha, Tokyo, Japan

[21] Appl. No.: 913,060

[22] Filed: Jul. 14, 1992

[30] Foreign Application Priority Data

Nov. 14, 1991 [JP] Japan ............................ 3-093454[U]
Mar. 5, 1992 [JP] Japan ............................ 4-011225[U]

[51] Int. Cl.[5] ............................................ F16K 11/02
[52] U.S. Cl. .................................................. 137/102
[58] Field of Search ............................ 137/512.2, 102; 285/340, 319

[56] References Cited

U.S. PATENT DOCUMENTS

| | | | |
|---|---|---|---|
| 3,027,907 | 4/1962 | Lee | 137/512.4 X |
| 3,294,111 | 12/1966 | Abercrombie | 137/102 X |
| 3,631,877 | 1/1972 | Barosko | 137/102 |
| 3,851,658 | 12/1974 | Bunyard | 137/102 |
| 3,895,648 | 7/1975 | Stoll | 137/102 X |
| 4,586,535 | 5/1986 | Stoll | 137/102 X |
| 4,895,395 | 1/1950 | Ceriani | 285/340 X |
| 4,919,457 | 4/1990 | Moretti | 285/340 X |

OTHER PUBLICATIONS

Festo Pneumatic (5 pages), undated publication.

*Primary Examiner*—Robert G. Nilson
*Attorney, Agent, or Firm*—Oblon, Spivak, McClelland, Maier & Neustadt

[57] ABSTRACT

Disclose herein is an exhaust valve capable of quickly discharging either a fluid in a cylinder or compressed air in a pneumatic tank therefrom. The exhaust valve is basically provided with a first port, a second port, a third port and a directional control valve. The first port is supplied with a fluid and the second port is used to supply the fluid to another device or receive it therefrom. The third port is used to discharge the fluid therefrom and comprises a rotatable L-shaped line or pipe. The directional control valve is switched to cause the first port to communicate with the second port or cause the second port to communicate with the third port in response to the pressure of the fluid supplied from each of the ports. The first and second ports have axial directions respectively which substantially coincide with each other or extend approximately in parallel. Therefore, the first and second ports can be incorporated in the course of a pipe without making a change in a piping direction. Since the third port comprises the rotatable L-shaped line, the axial direction of the third port can be suitably changed to a desired direction.

10 Claims, 3 Drawing Sheets

EXHAUST VALVE

BACKGROUND OF THE INVENTION

1. Field of the Invention

The present invention relates to an exhaust valve capable of rapidly discharging, e.g., either a fluid in a cylinder or compressed air in a pneumatic tank therefrom.

2. Description of the Related Art

FIG. 1 shows a conventional exhaust valve. An exhaust valve 2 comprises a first body 4 and a second body 6. The first body 4 has first and second ports 8, 10 defined therein, which have screw threads respectively, and a hole 12 which communicates with the first and second ports 8, 10. The second body 6 has a third port 14 which is defined therein and has a screw thread, and a hole 16 which is defined in the leading end 18 of the second body 6 and communicates with the third port 14. A lip packing 22 having a sleeve 20 is disposed in the bottom of the hole 12 of the first body 4, and the second body 6 is fitted in the bottom thereof.

When a fluid is supplied from the first port 8, the exhaust valve 2 constructed in the above-described manner is actuated to displace the lip packing 22 in the direction indicated by the arrow A so as to be seated on the leading end 18 of the second body 6, thereby cutting off the communication between the hole 16 of the second body 6 and the hole 12 of the first body 4. Further, the sleeve 20 of the lip packing 22 is reduced in diameter by the pressure of the fluid supplied from the first port 8 so as to be opened, i.e., make a communication state, thereby making it possible to supply the fluid supplied from the first port 8 to the second port 10. When, on the other hand, the supply of the fluid from the first port 8 is stopped and the fluid is supplied from the second port 10, the pressure of the fluid acts on the sleeve 20 of the lip packing 22, that is, the outer diameter of the sleeve 20 increases so as to bring a peripheral edge of the sleeve 20 into abutment against an inner wall portion for defining the hole 12 in the first body 4, thereby separating the lip packing 22 from the leading end 18. Thus, the fluid supplied from the second port 10 is supplied via the hole 16 of the second body 6 to the third port 14.

When it is desired to dispose the exhaust valve 2 constructed as described above to a pipe coupled to a cylinder or the like, the first and second ports 8, 10 are connected to a fluid feed source and the cylinder respectively, and the third port 14 is open to the atmosphere. When the fluid is supplied to the cylinder under this connection, it flows into the second port 10 from the first port 8. When the fluid is discharged from the cylinder, it flows into the third port 14 from the second port 10 so as to be discharged into the atmosphere.

By disposing the exhaust valve 2 in the pipe coupled to the cylinder in the above-described manner, the a piping distance to an exhaust portion from which the fluid is exhausted can be reduced, thereby making it possible to quickly discharge the fluid and improve the response characteristic of the cylinder. Since the piping distance to the exhaust portion can be reduced, portions or ranges to which water or moisture adheres, can be reduced to a minimum.

However, the second port 10, when it communicates with a device such as the cylinder or the like to thereby supply the fluid to the cylinder and discharge it therefrom, is disposed at a right angle to the first port 8. Therefore, a pipe is limited to a so-called L-shaped line or tube. Thus, when the exhaust valve 2 is connected to a linearly pipe-arranged portion, a change in a piping direction should be carried out. The piping direction to the third port 14 is also restricted. Further, when a non-metallic member such as vinyl is used as a pipe, it cannot be connected to each of the first through third ports 8, 10, 14 which have been formed so as to be connected with a corresponding object by screw threads, and a connecting process becomes cumbersome.

SUMMARY OF THE INVENTION

It is an object of the present invention to provide an exhaust valve connectable to a pipe without making a change in a piping direction.

It is another object of the present invention to provide an exhaust valve easily connectable even to a pipe formed of a flexible non-metallic member such as vinyl.

It is a further object of the present invention to provide an exhaust valve having ports each displaceable in a piping direction.

It is a still further object of the present invention to provide an exhaust valve which can be used as a shuttle valve.

It is a still further object of the present invention to provide an exhaust valve comprising a first port supplied with a fluid, a second port for supplying the fluid to another device or supplied with the fluid from the above device, a third port for discharging the fluid therefrom, and a directional control valve switched so as to cause the first port to communicate with the second port or cause the second port to communicate with the third port in response to the pressure of the fluid supplied from each of the first, second and third ports, the first and second ports having axial directions, respectively, which approximately coincide with each other or extend substantially in parallel.

It is a still further object of the present invention to provide an exhaust valve wherein each of the first and second ports is provided with a connecting member for connecting a tube thereto and disconnecting the same therefrom.

It is a still further object of the present invention to provide an exhaust valve wherein the connecting member comprises a chuck member shaped in the form of a cylinder and having a plurality of claw-shaped portions whose leading ends are bent inward, a guide member disposed on the inner peripheral surface of each of cylindrical holes for defining the ports, for supporting the chuck member, and a release bush held in abutment against the inner peripheral surface of the chuck member and disposed in such a manner that the leading end of the release bush abuts against the claw-shaped portions of the chuck member, the chuck member, the guide member and the release bush being disposed in one of the cylindrical holes which define the first, second and third ports respectively.

It is a still further object of the present invention to provide an exhaust valve wherein the third port is provided with a silencer.

It is a still further object of the present invention to provide an exhaust valve wherein the third port is rotatable.

It is a still further object of the present invention to provide an exhaust valve wherein the third port comprises a rotatable L-shaped line.

It is a still further object of the present invention to provide an exhaust valve wherein each of the first through third ports is provided with a connecting member for connecting a tube thereto and disconnecting the same therefrom.

It is a still further object of the present invention to provide an exhaust valve wherein the connecting member comprises a chuck member shaped in the form of a cylinder and having a plurality of claw-shaped portions whose leading ends are bent inward, a guide member disposed on the inner peripheral surface of each of cylindrical holes for defining the ports, for supporting the chuck member, and a release bush brought into abutment against the inner peripheral surface of the chuck member and disposed in such a manner that the leading end of the release bush abuts against the claw-shaped portions of the chuck member, the chuck member, the guide member and the release bush being disposed in one of the cylindrical holes which define the first, second and third ports respectively.

It is a still further object of the present invention to provide an exhaust valve wherein the directional control valve is used as a shuttle valve by causing the first and third ports to communicate with a fluid-pressure feed source and causing the second port to communicate with another device.

The above and other objects, features and advantages of the present invention will become apparent from the following description and the appended claims, taken in conjunction with the accompanying drawings in which preferred embodiments of the present invention are shown by way of illustrative example.

DETAILED DESCRIPTION OF THE PREFERRED EMBODIMENTS

Figure 1:
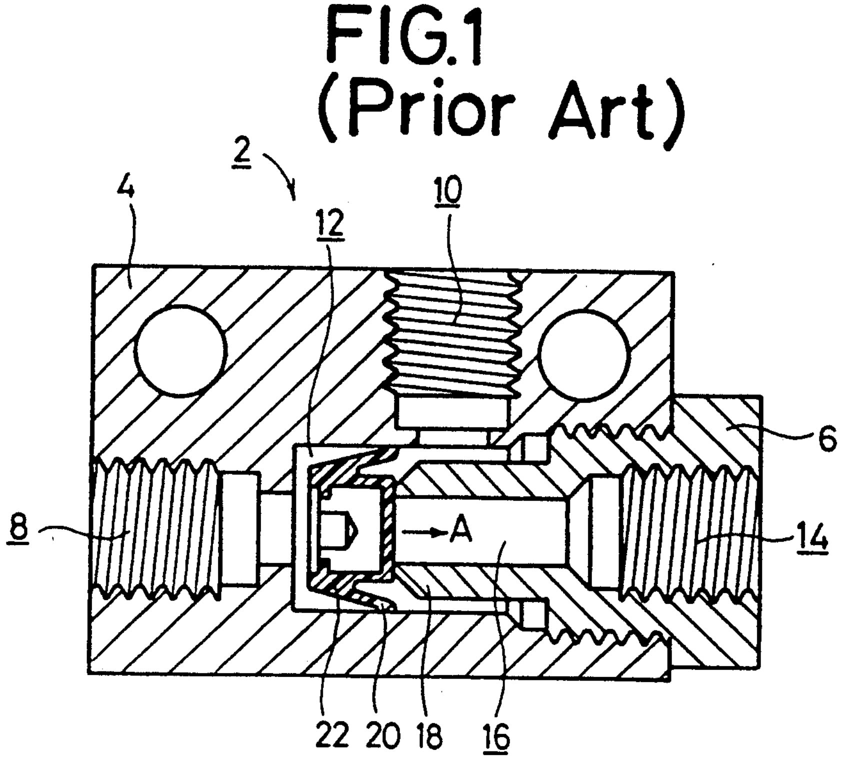
FIG.1 (Prior Art)
FIG. 1 is a vertical cross-sectional view showing a conventional exhaust valve.
Figure 2:
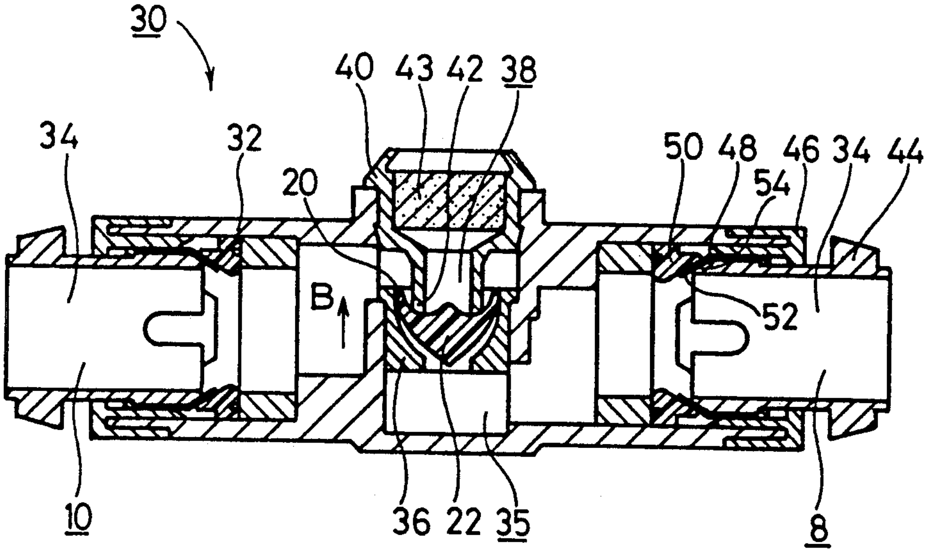
FIG. 2 is a vertical cross-sectional view illustrating an exhaust valve according to one embodiment of the present invention.

An exhaust valve according to a first embodiment of the present invention will first be described with reference to FIG. 2. Incidentally, the same elements of structure as those employed in a prior art shown in FIG. 1 are identified by like reference numerals and their detailed description will therefore be omitted.

An exhaust valve 30 has a first port 8 and a second port 10 which are defined respectively at opposed ends of a cylindrical body 32 and each of which has a one-touch type fitting or joint 34 to be described later. The first port 8 and the second port 10 are formed in such a manner that both axial directions are substantially held in alignment with each other. Incidentally, the approximate coincidence of the two axial directions with each other includes the following conditions. That is, the axes of the two ports 8 and 10 coincide with each other and extend in parallel. Alternatively, the axial direction of the first port 8 has a slight angle to the axial direction of the second port 10. A hole 35, which communicates with the first and second ports 8, 10 at a right angle as seen from the outer peripheral surface of the cylindrical body 32, is defined in a substantially central portion of a through hole of the cylindrical body 32.

A valve seat 36 is disposed in the center of the hole 35. An exhaust member 40 having a hole 38 which substantially serves as an exhaust hole and is defined therein, is fitted in a convex portion which extends outward from the outer peripheral surface of the cylindrical body 32. The leading end 42 of the exhaust member 40 is held in front of a passage which causes the first and second ports 8, 10 to communicate with each other. A lip packing 22 is disposed between the valve seat 36 and the leading end 42. A silencer 43 formed of a sponge or the like is disposed in a large-diameter portion of the hole 38 of the exhaust member 40.

In order to supply fluid pressure from an unillustrated external device, the one-touch type fitting 34 is formed such that one end of a vinyl tube or the like can be inserted therein. More specifically, the one-touch type fitting 34 has a release bush 44. In addition, the one-touch type fitting 34 includes a guide member 46, a chuck member 48 and a sealing member 50 successively disposed outwardly of the release bush 44.

The sealing member 50 is situated at the bottom of a hole of the first port 8. The sealing member 50 is shaped in the form of a ring and has an inner peripheral surface inclined at a given angle.

The chuck member 48 is formed of a metallic plate having elasticity, which is shaped in the form of a ring. In addition, the chuck member 48 has a plurality of slits defined in the side face thereof at equal intervals, and internally-bent claw-shaped portions 52 formed in the leading end of the chuck member 48. The leading ends of the claw-shaped portions 52 extend sharply.

The guide member 46 has a circumferentially-defined recess which is fitted on the leading end of the cylindrical body 32 and held in abutment against one side face of the chuck member 48.

The release bush 44 is shaped substantially in the form of a cylinder and has a circumferential edge 54 formed in the leading end thereof, which is brought into abutment against the claw-shaped portions 52 of the chuck member 48 upon insertion of the release bush 44 into the cylindrical body 32. In addition, the release bush 44 has a plurality of unillustrated slits defined in its side face at equal intervals.

Figure 3:
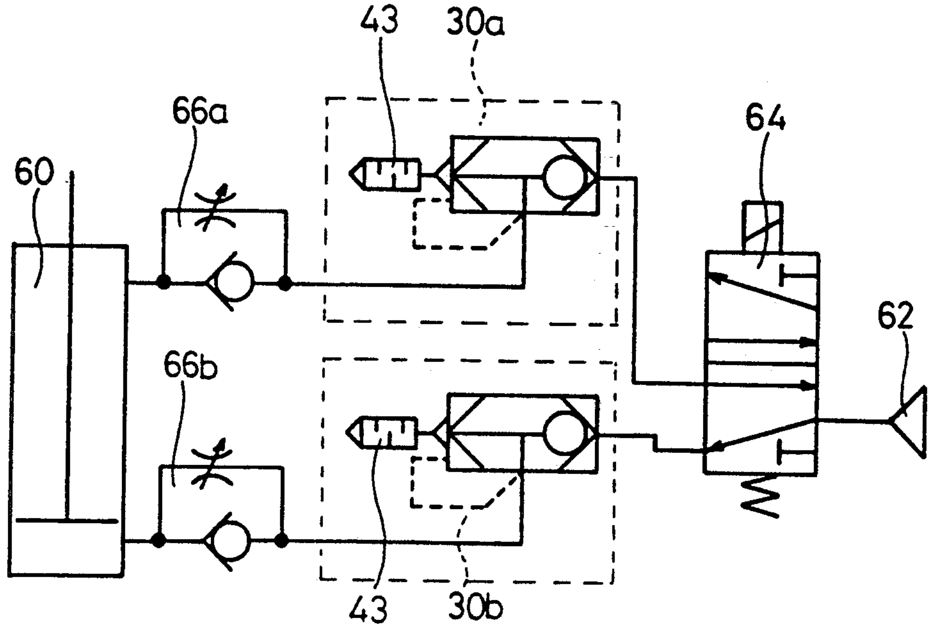
FIG. 3 is a view for describing a meter-in circuit of a cylinder, in which the two exhaust valves according to the present invention have been incorporated.

A meter-in circuit including exhaust valves 30$a$, 30$b$ according to the present embodiment will now be described with reference to FIG. 3. Incidentally, each of the exhaust valves 30$a$, 30$b$ is identical in structure to the exhaust valve 30, and components of the exhaust valves 30$a$, 30$b$ will be described with reference to FIG. 2. The meter-in circuit is actuated to cause a directional control valve 64 to switch the flow of compressed air supplied from a compressed-air feed source 62 so as to supply the air to a cylinder 60 via the exhaust valves 30$a$, 30$b$ and flow control valves 66$a$, 66$b$.

The leading end of a vinyl tube or the like, which is in communication from the directional control valve 64, is first inserted into the first port 8 of each of the exhaust valves 30$a$, 30$b$. When the vinyl tube is lightly pulled after the leading end thereof has been inserted into the bottom of the hole of the first port 8, the claw-shaped portions 52 of the chuck member 48 of the one-touch type fitting 34 are stuck into the vinyl tube so as to prevent the vinyl tube from being disconnected from the first port 8. Thus, the vinyl tube and the first port 8 can be reliably coupled to each other. Likewise, the second port 10 is also coupled to the vinyl tube which is in communication from the flow control valves 66*a*, 66*b*.

The compressed air is then supplied to the exhaust valve 30*b* from the compressed-air feed source 62 via the directional control valve 64 after the above process has been carried out. The compressed air, which has been introduced into the exhaust valve 30*b* from the first port 8, reaches the hole 35 so as to displace the lip packing 22 in the direction indicated by the arrow B as seen in the drawing, thereby bringing the lip packing 22 into abutment against the leading end 42 of the exhaust member 40. Further, the pressure of the compressed air is applied to the lip packing 22 to open a sleeve 20 so as to cause the first and second ports 8, 10 to communicate with each other. Thus, the compressed air is supplied to the cylinder 60 from the exhaust valve 30*b* via the flow control valve 66*b*. A piston of the cylinder 60 is displaced so as to cause the air to flow into the second port 10 of the exhaust valve 30*a* from the other of both chambers of the cylinder 60 through the flow control valve 66*a*. In the exhaust valve 30*a*, the lip packing 22 is displaced downward by the pressure of the air which has reached the second port 10, so as to be seated on the valve seat 36, thereby cutting off or blocking the communication between the first and second ports 8 and 10. In addition, the lip packing 22 is moved away from the leading end 42 of the exhaust member 40 so as to cause the second port 10 and the hole 38 of the exhaust member 40 to communicate with each other. Noise developed in the air, which has reached the second port 10, is deadened or silenced by the silencer 43 disposed in the hole 38, after which the air thus processed is discharged into the outside.

Each of the exhaust valves according to the present embodiment has the first and second ports 8, 10 which are formed so as to substantially extend along a straight line. Therefore, the exhaust valve can be coupled to a desired position without making a change in a piping direction or the like even if it is incorporated in the course of a pipe or tube. In a fluid circuit coupled to the cylinder 60, the exhaust valves 30*a*, 30*b* are disposed between the directional control valve 64 and cylinder 60 so as to substantially reduce the piping distance to an exhaust portion of the cylinder 60 from which the air is exhausted, thereby making it possible to reduce water or moisture developed in the course of the pipe depending on the displacement of the piston of the cylinder 60 and decrease the amount of moisture which adheres to the inside of a line. When the amount of moisture which has adhered to the inside of a nonmetallic pipe such as a vinyl tube increases, the vinyl tube or the like is cut at a desired position and the exhaust valve 30 is inserted into the cut portion thereof from the one-touch type fitting 34, thereby making it possible to reduce the moisture which is to be developed.

Figure 4:
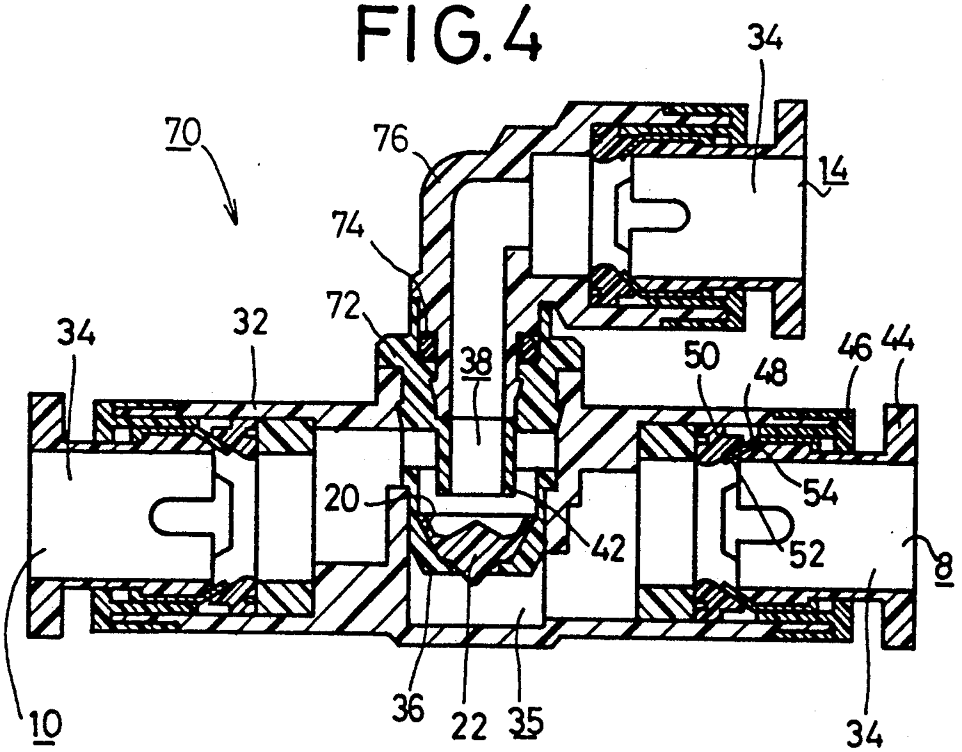
FIG. 4 is a vertical cross-sectional view depicting an exhaust valve according to another embodiment of the present invention.

Another embodiment of the present invention will now be described with reference to FIG. 4. Incidentally, the same elements of structure as those employed in the first embodiment are identified by like reference numerals and their detailed description will therefore be omitted.

An exhaust valve 70 has a first port 8, a second port 10 and a third port 14 which are defined in a cylindrical body 32 formed of a resin and each of which has a one-touch type fitting or joint 34 to be described later. The first port 8 and the second port 10 are formed in such a manner that both axial directions substantially coincide with each other. A hole 35, which communicates with the first and second ports 8, 10 at a right angle as seen from the outer peripheral surface of the cylindrical body 32, is defined in a substantially central portion of the cylindrical body 32 of the exhaust valve 70. A valve seat 36 is disposed in the center of the hole 35. A connecting member 72 having a hole 38 defined therein is fitted in a convex portion formed so as to project from the outer peripheral surface of the cylindrical body 32. An L-shaped pipe or line 76, which can be rotated in the axial direction of the hole 38, is disposed in a large-diameter portion of the hole 38 of the connecting member 72 with an O ring 74 interposed between the connecting member 72 and the L-shaped line 76. The third port 14 provided with the one-touch type fitting 34 is coupled to the leading end of the L-shaped line 76.

Figure 5:
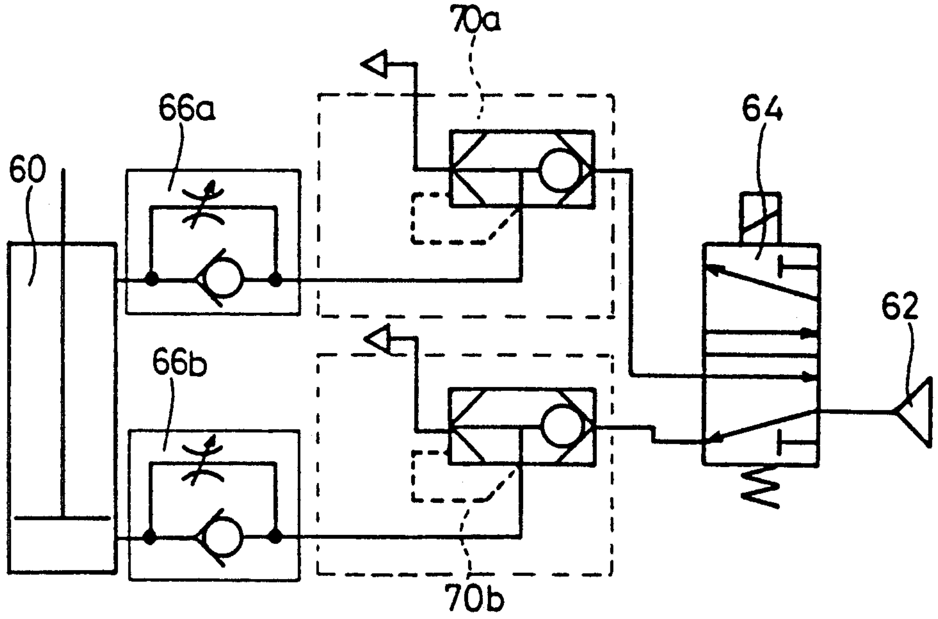
FIG. 5 is a view for describing a meter-in circuit of a cylinder, in which the two exhaust valves according to the present invention have been incorporated.

A meter-in circuit including exhaust valves 70*a*, 70*b* according to the present embodiment will now be described with reference to FIG. 5. Incidentally, each of the exhaust valves 70*a*, 70*b* is identical in structure to the exhaust valve 70, and components of the exhaust valves 70*a*, 70*b* will be described with reference to FIG.4. The meter-in circuit is substantially identical to that employed in the first embodiment. The same elements of structure as those employed in the first embodiment are identified by like reference numerals and their detailed description will therefore be omitted. In this case, the third port 14 is coupled to the vinyl tube by turning the vinyl tube in the direction in which it is not bent because the L-shaped line 76 is rotatable with respect to the connecting member 72. Accordingly, air, which has reached the second port 10, passes through the hole 38 and is discharged from an exhaust port located in place to the outside together with moisture in a pipe through the L-shaped line 76 and the third port 14.

In the exhaust valve according to the present embodiment, the L-shaped line 76 is fitted in the larger-diameter portion of the hole 38 so as to be rotatable in the direction normal to the cylindrical body 32. In addition, the third port 14 is disposed in the leading end of the L-shaped line 76. Therefore, the vinyl tube can be connected to the third port 14 by rotating the third port 14 through the L-shaped line 76 in such a manner that the vinyl tube is not bent.

Incidentally, the exhaust valve 70 can also be used as a shuttle valve for supplying a fluid to the second port 10 from either the first port 8 or the third port 14 which is under high pressure, by coupling a fluid feed source such as a compressed-air feed source 62 or the like to the first and third ports 8, 14 of the exhaust valve 70 and connecting the second port 10 to another device in such a manner that the fluid is supplied from the second port 10 thereto.

Each of the exhaust valves according to the present invention can bring about the following advantageous effects.

More specifically, first and second ports are provided in such a manner that axial directions of these ports are substantially held in alignment with each other or extend approximately in parallel. Therefore, the first and second ports can be incorporated in the course of a pipe without making a change in a piping direction. Since a rotatable unit comprised of an L-shaped line having a third port is rotatably mounted on a main body provided with the first and second ports, the axial direction of the third port can be suitably changed to a desired direction by rotating the rotatable unit in the piping direction. Further, a connecting member, e.g., a chuck member supported by a guide member is disposed in each of the first through third ports. Thus, when a pipe such as a vinyl tube is used, the vinyl tube is brought into engagement with claw-shaped portions of the chuck member by simply cutting a part of the vinyl tube or the like and inserting it into a desired exhaust valve, thereby making it possible to easily connect the vinyl tube to each of the first through third ports. Furthermore, the piping distance to an exhaust portion from which a fluid is exhausted can be reduced, so as to decrease the quantity of moisture which adheres to the inside of a pipe, by incorporating the exhaust valves in a fluid circuit coupled to a cylinder. The exhaust valve can also be used as a shuttle valve by coupling first and second fluid feed sources to the first and third ports respectively and connecting another device to the second port.

Having now fully described the invention, it will be apparent to those skilled in the art that many changes and modifications can be made without departing from the spirit or scope of the invention as set forth herein.

What is claimed is:

1. An exhaust valve comprising:

a first port supplied with a fluid;

a second port in fluid communication with an external device;

a third port for discharging the fluid therefrom; and a direction control valve switchable in response to the pressure of the fluid flowing in one direction so as to cause said first port to communicate with said second port while sealing said third port relative to said first and second ports, and switchable in response to the pressure of the fluid flowing in an opposite direction so as to cause said second port to communicate with said third port while sealing said first port relative to said second and third ports;

said first and second ports having axial directions, respectively, which approximately coincide with each other or extend substantially in parallel;

wherein said control valve has a seal member which is movable in response to the fluid flow thereagainst, along an axis transverse to said first and second port axial directions, and said communication and sealing is effected by the movement of said seal member.

2. An exhaust valve according to claim 1, wherein said seal member is substantially concave in its section facing the fluid flowing in said opposite direction.

3. An exhaust valve according to claim 2, wherein said connecting member comprises:

a chuck member shaped in the form of a cylinder and having a plurality of claw-shaped portions whose leading ends are bent inward;

a guide member disposed on the inner peripheral surface of each of cylindrical holes for defining said ports, for supporting said chuck member; and a release bush held in abutment against the inner peripheral surface of said chuck member and disposed in such a manner that the leading end of said release bush abuts against said claw-shaped portions of said chuck member;

said chuck member, said guide member and said release bush being disposed in one of said cylindrical holes which define said first, second and third ports respectively.

4. An exhaust valve according to any of claims 1 to 3, wherein said third port is provided with a silencer.

5. An exhaust valve according to claim 1, wherein said third port is rotatable.

6. An exhaust valve according to claim 5, wherein said third port comprises a rotatable L-shaped line.

7. An exhaust valve according to claim 5 or 6, wherein each of said first through third ports is provided with a connecting member for connecting a tube thereto and disconnecting the same therefrom.

8. An exhaust valve according to claim 7, wherein said connecting member comprises:

a chuck member shaped in the form of a cylinder and having a plurality of claw-shaped portions whose leading ends are bent inward;

a guide member disposed on the inner peripheral surface of each of cylindrical holes for defining said ports, for supporting said chuck member; and a release bush brought into abutment against the inner peripheral surface of said chuck member and disposed in such a manner that the leading end of said release bush abuts against said claw-shaped portions of said chuck member;

said chuck member, said guide member and said release bush being disposed in one of said cylindrical holes which define said first, second and third ports respectively.

9. An exhaust valve according to claims 1, 2, 3, 5 or 6 wherein said directional control valve is used as a shuttle valve by causing said first and third ports to communicate with a fluid-pressure feed source and causing said second port to communicate with another device.

10. An exhaust valve according to claims 5 or 6, wherein each of said first through third ports is provided with a connecting member for connecting a tube thereto and disconnecting the same therefrom, and wherein said directional control valve is used as a shuttle valve by causing said first and third ports to communicate with a fluid-pressure feed source and causing said second port to communicate with another device.

* * * * *